Patented Nov. 9, 1943

2,334,103

UNITED STATES PATENT OFFICE 2,334,103

PROCESS OF PRODUCING SUBSTITUTED ALPHA-NAPHTHOQUINONES

Charles Frederick Koelsch, Minneapolis, Minn., assignor to Regents of the University of Minnesota, Minneapolis, Minn., a corporation of Minnesota No Drawing. Application February 28, 1941, Serial No. 381,082

3 Claims. (Cl. 260—396)

The present invention relates to a process of producing substituted alpha-naphthoquinones, and more particularly to processes of producing substances which are of the same general class as vitamin K.

It is a principal object of the invention to provide an efficient and economical process for the production of substituted alpha-naphthoquinones, and to provide processes for the production of compounds which may be utilized for the purposes for which vitamin K is now utilized.

A further object of my invention is to provide a process for producing compounds other than vitamin K which have valuable nutritional and physiological characteristics.

These and other objects of my invention will be readily apparent from a consideration of the following specification in conjunction with the appended claims.

The interest in these and similar compounds has been stimulated by the current interest in the vitamins, particularly vitamin K. The compounds are known, in general, but heretofore have been prepared by laborious and inefficient methods.

By the process of this invention, it is possible to produce 1,4-naphthoquinones and hydroquinones containing a hydrocarbon residue in position 2 and a hydrogen, a hydroxyl, or a carbethoxyl in position 3, as shown in the following ring structure numbered according to the conventional system:

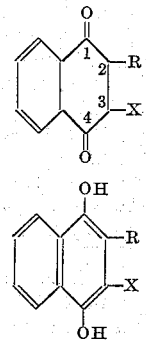

where R is an alkyl group and X is hydrogen or a hydroxyl or carbethoxyl group.

Some of these reactions take place in a manner which is not completely understood, although a theory offering a sufficient explanation has been formulated and which will be explained in connection with those steps.

The process may be outlined as comprising a series of three preliminary reactions followed by several other steps, which latter steps may be varied depending upon the end products desired.

The first three reactions may be summarized in general terms as follows:

Step 1.—2-alkyl indan-1,3-diones are prepared by the action of ethyl phthalate on an alkyl ester of an alkyl substituted acetic acid in the presence of an alkali metal.

Step 2.—The alkali metal derivative of a 2-alkyl indan-1,3-dione is treated with an ester of a halogenated acetic acid, yielding a 1,3-diketo-2-alkyl indanyl acetic ester.

Step 3.—The diketonic esters so obtained are treated with an alkali metal alkoxide, giving a 2-alkyl-1,4-naphthohydroquinone-3-carboxylic ester.

In the following equations, using structural formulas corresponding to the above steps, R is used to denote an alkyl group. The alkali metals are represented by Na as an example.

STEP 1

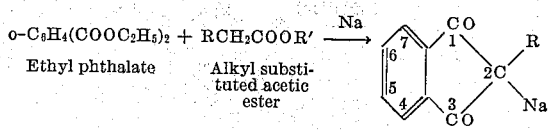

Structure I
(Sodium salt of 2-alkyl indan-1,3-dione)

In this equation, the compound RCH$_2$COOR' is an alkyl (R') ester of an alkyl (R) substituted acetic acid. (R') may be any simple alkyl radical such as ethyl or methyl since it is ultimately discarded in the processes of reaction, whereas R appears in the ultimate product and is preferably methyl, ethyl, n-propyl or n-butyl.

STEP 2

Structure I + BrCH$_2$COOC$_2$H$_5$ ⟶

Ethyl brom-acetate

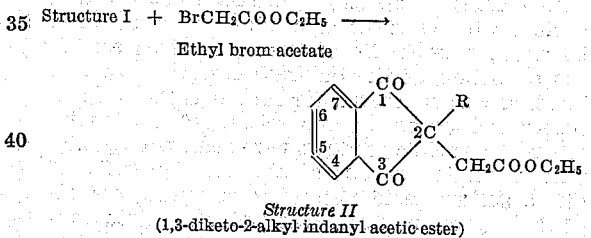

Structure II
(1,3-diketo-2-alkyl indanyl acetic ester)

STEP 3

Structure II + NaOC$_2$H$_5$ ⟶ $\xrightarrow{H+}$

Sodium alkoxide

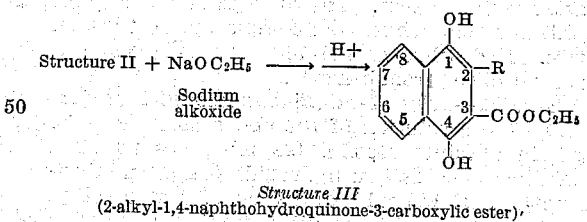

Structure III
(2-alkyl-1,4-naphthohydroquinone-3-carboxylic ester)

For convenience in reference, the symbols I, II, and III will be used to represent the principal product of each of the reactions, as indicated above.

As the next step, the hydroquinone esters (Structure III) obtained in Step 3 are hydrolyzed to the free acids. These are oxidized to the quinone acids which are decarboxylated giving a 2-alkyl-1,4-naphthoquinones (Structure IV), or the hydroquinone acids are decarboxylated and subsequently oxidized to the quinone. The hydroquinone esters may be oxidized in alkaline solution to give 2-alkyl-3-hydroxy-1,4-naphthoquinones (Structure V), and treated in a slightly different manner to give 2-alkyl-3-carbethoxy-1,4 naphthoquinones (Structure VI).

The following structural formulas illustrate the last described reactions:

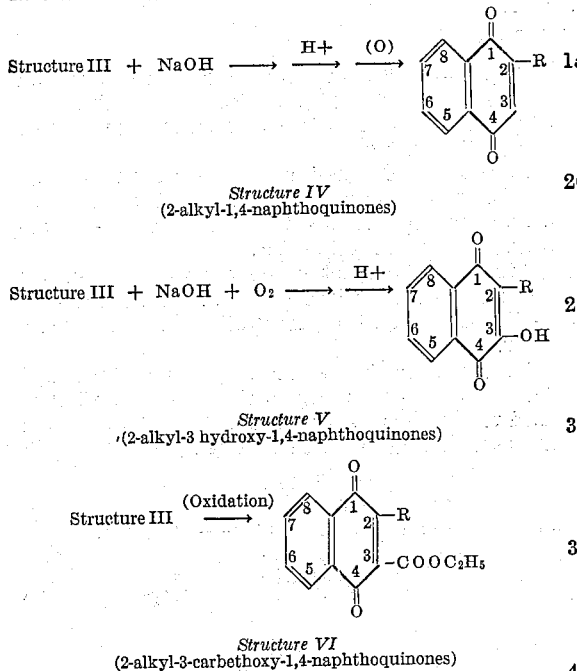

Structure IV
(2-alkyl-1,4-naphthoquinones)

Structure V
(2-alkyl-3 hydroxy-1,4-naphthoquinones)

Structure VI
(2-alkyl-3-carbethoxy-1,4-naphthoquinones)

The invention will be further illustrated in the following specific examples, which however, are not intended as limitations on the invention. In the examples immediately following, the alkyl radical R of the above structures is ethyl:

EXAMPLE A

STEP 1.—2-ethylindanedione-1,3 (I).—To a hot (115°) mixture of ethyl phthalate (55 g.) and sodium wire (10.5 g.) was added 30 g. of ethyl butyrate, wherein R′ of Step 1 is ethyl and R (as a portion of the butyrate residue) is ethyl. Heating was continued for four hours; the mixture was then cooled and triturated with moist ether. The acidic products were removed by solution in dilute aqueous alkali. The quantity of dilute sulfuric acid necessary to precipitate all of the organic material was added in three portions, the mixture being extracted with ether after each addition. The third extract contained phthalic acid, while the diketone was in the first two. It distilled at 135–140° (7 mm.), and was recrystallized from benzene.

STEP 2.—Ethyl 2-ethylindanedionyl-2-acetate (II).—To a solution of the above diketone (13.6 g.) in absolute alcohol (25 ml.) was added a solution of potassium hydroxide (4.4 g.) in absolute alcohol (50 ml.) and then 13.0 g. of ethyl bromo-acetate. The resulting mixture was boiled for two and one-half hours, distilled to a volume of 40 ml. and poured into water. The precipitated oil soon solidified and was then recrystallized from alcohol.

STEP 3.—2-ethyl-3-carbethoxy-1,4-naphthohydroquinone (III).—The above diketo-ester (13.8 g.) was added to a solution of sodium (3 g.) in absolute alcohol (40 ml.) under a hydrogen atmosphere. The resulting reddish-brown solution was boiled for two hours, and then air-free water (50 ml.) was added through the condenser. The whole was poured into 600 ml. of air-free cold dilute sulfuric acid, and the precipitated pale yellow product was crystallized from alcohol.

The above compound III resulting from Step 3 may be treated in several ways, depending upon whether the end product desired is Compound IV, V, or VI. Three illustrations are given:

STEP 4.—2-ethylnaphthoquinone (IV).—A solution of 2-ethyl-3-carbethoxynaphthohydroquinone (1 g.) in 12 ml. of 5% sodium hydroxide containing 5 drops of alcohol was boiled under hydrogen for two hours. Acidification under hydrogen gave a solid which was removed, dissolved in acetic acid (10 ml.) and treated with a solution of chromic acid (0.5 g.) in water. This mixture was heated on a water-bath for fifteen minutes and then diluted with water. The resulting precipitate was obtained in the form of yellow needles (0.55 g., 77%) that melted at 87–88° by crystallization from acetic acid.

STEP 5.—2-ethyl-3-hydroxy-1,4-naphthoquinone (V).—Sodium hydroxide (20 ml. of 1%) was added to 2-ethyl-3-carbethoxy-naphthohydroquinone (1 g.) in warm alcohol (5 ml.). Air was bubbled through the solution at 50° for ten minutes, and then heating was continued for ten minutes without the air stream. The water solution was decanted from the yellow oil into cold dilute acetic acid, and the yellow product which separated was crystallized twice from alcohol.

STEP 6.—2-ethyl-3-carbethoxy-1,4-naphthoquinone (VI).—2-ethyl-3-carbethoxynaphthohydroquinone was oxidized with chromic acid in cold acetic acid. The resulting yellow quinone was crystallized from a mixture of ether and petroleum ether.

The exact conditions and reagents in the above steps have been given merely as an example and may vary, as required, without departing from the spirit of the invention. Although ethyl was used in place of R, it has been found that alkyls such as methyl, normal propyl and normal butyl may also be used. Sodium in Steps 1 and 2 may also be replaced by one of the other alkali metals, lithium, potassium or calcium being exemplary. Other equivalents are also obvious, such as the substitution of any other air-free inorganic or organic acid in place of sulfuric acid in Step 3.

The invention is also illustrated in the following example in which the radical R is n-propyl.

EXAMPLE B

STEP 1.—2-n-propyl indan-1,3-dione (Structure I).—Ethyl phthalate (55 g.) and sodium wire (11 g.) were heated to 110°. Ethyl n-valerate (34 g.) was added in small portions, waiting for the rather vigorous reaction to subside each time. It may be noted that in the compound ethyl n-valerate, ethyl represents the radical R′ of Equation 1 whereas R (n-propyl) is present as a portion of the n-valerate residue. After heating at 110°–120° for four and one-half hours, the dark resinous mass was cooled to room temperature and worked up with moist ether. The resulting suspension of amber colored salt was extracted with dilute alkali, which was then acidified with dilute sulfuric acid and extracted with ether. After drying over sodium sulfate, the ether was removed and the resulting dark red oil distilled at 4 mm. with the bath at 150°–180°. Much phthalic anhydride sublimed into the receiver along with the dione, a yellow liquid. The dione was decanted from the anhydride which was subsequently washed twice by decantation using benzene as the solvent. After removal of the benzene, the resulting yellow liquid was combined with that previously obtained. Cooling in an ice bath caused further separation of phthalic anhydride which was removed by filtration. The resulting yellow liquid (Structure I) weighed 8 g. (17%) and solidified on standing overnight in the ice box. A small portion recrystallized three times from a little alcohol at −10° melted at 48°–49.5°.

STEPS 2 AND 3.—*2-n-propyl-3-carbethoxy-1,4-naphthohydroquinone (Structure III)*.—2-n-propyl indan-1,3-dione (Structure I), (2 g. of crude material) was dissolved in 5 cc. absolute alcohol. To this was added in the cold a solution of 0.6 g. potassium hydroxide in 8 cc. absolute alcohol and then 1.8 g. ethyl bromacetate. After refluxing one and one-half hours the alcohol was evaporated to one-third its volume on the steam bath and the residue taken up in ether. The unreacted dione was removed by washing with dilute alkali. After drying the ether solution over sodium sulfate, the solvent was thoroughly removed at 50° and 50 mm. The 1,3-diketo-2-n-propyl indanyl acetic ester (Structure II) remained as a yellow liquid, which was refluxed in a hydrogen atmosphere for one and one-quarter hours in a solution of 0.4 g. sodium in 15 c. c. absolute ethanol. The alcohol was removed to a skum and 10 c. c. of boiled, cooled water added through the condenser. The light brown amorphous precipitate which resulted on dilution with 100 c. c. boiled, cooled, acidified water was recrystallized from alcohol-water once and from benzene once. The product crystallizes in very pale yellow needles. Yield 0.41 g. (14% for the two steps). Melting point 125°–126.5°. Anal. calc. for $C_{16}H_{18}O_4$: C, 70.05; H, 6.60. Found: C, 69.92; H, 6.79.

STEP 5.— *2-n-propyl-3-hydroxy-1,4-naphthoquinone (Structure V)*.—2-n-propyl-3-carbethoxy-1,4-naphthohydroquinone (Structure III) (0.5 g.) was dissolved in 3 c. c. warm alcohol. To this was added 10 c. c. 1% sodium hydroxide, and the whole heated at 50° with air passing through for 15 minutes. The red solution was decanted from the yellow oil into dilute acetic acid. A small amount of the desired product, a brown oil, separated.

Steps 4 and 6 may, if desired, be carried out upon 2-n-propyl-3-carbethoxy-1,4-naphthohydroquinone (Structure III) in a manner similar to that set forth in Example A.

The invention may be further illustrated in the following example in which the radical R is n-butyl.

EXAMPLE C

STEP 1.—*2-n-butyl indan-1,3-dione (Structure III)*.—Ethyl phthalate (55 g.) and sodium wire (11 g.) were heated to 115°. Ethyl n-caproate (38 g.) was added in small portions, waiting each time for the vigorous reaction to subside. It may be noted that in the compound n-caproate, ethyl represents the radical R′ of Equation 1 whereas R (n-butyl) is present in the n-caproate residue. After four and one-quarter hours at 100°–110° the dark resinous mass was worked up with moist ether. The resulting suspension of amber colored salt was extracted with dilute alkali, which was then acidified with dilute sulfuric acid and extracted with ether. After drying over sodium sulfate, the ether was removed and the resulting red oil distilled at about 1 mm. The fraction boiling at 155°–160° was collected. The product, 9 g. (18%), was a dark yellow liquid which solidified on standing in the ice box overnight, and again became liquid at a temperature of 35°.

STEPS 2 AND 3.—*2-n-butyl-3-carbethoxy-1,4-naphthohydroquinone (Structure III)*.—2-n-butyl indan-1,3-dione (5.6 g. crude material) (Structure I) was dissolved in 10 c. c. absolute ethanol and converted to the red potassium salt by addition of potassium hydroxide (1.57 g.) in 15 c. c. absolute ethanol. Ethyl bromacetate (4.68 g.) then added and the solution refluxed for one and one-half hours. Most of the alcohol was removed on the steam bath and the residue taken up in ether, which was washed with dilute alkali before drying over sodium sulfate. Thorough removal of the ether at 50° and 30 mm. left 1,3-diketo-2-n-butyl indanyl acetic ester (Structure II) as a reddish-yellow oil. The ester (II) so obtained was dissolved in a solution of 0.6 g. sodium in 15 c. c. absolute ethanol and refluxed for one and one-quarter hours in a hydrogen atmosphere. Addition of 10 c. c. boiled, cooled water through the condenser was followed by dilution with 100 c. c. boiled, cooled, acidified water. The light brown amorphous precipitate (Structure III) was recrystallized from alcohol to give very pale yellow needles melting at 98.5°–100°. Yield 1.9 g. (24% for both steps). Anal. calc. for $C_{17}H_{20}O_4$: C, 70.78; H, 7.00. Found: C, 70.70; H, 7.09.

STEP 5.—*2-n-butyl-3-hydroxyl-1,4-naphthoquinone (Structure V)*.—2-n-butyl-3-carbethoxy-1,4-naphthohydroquinone (0.5 g.) (Structure III) was dissolved in 10 c. c. 1% sodium hydroxide by warming to about 65°. Air was bubbled through the red solution for 15 minutes while the temperature was maintained at about 60°. Pouring into dilute acetic acid produced yellow needles which were recrystallized from alcohol. The product melts at 100°–101°. Yield 0.22 g. (55%).

It is understood that in this example, Steps 4 and 6 may, if desired, be carried out in a manner similar to Example A.

The invention is also illustrated in the following example in which the radical R is n-propyl.

EXAMPLE D

STEP 1.—*2-methyl indan-1,3-dione (Structure I)*.—Ethyl phthalate (50 g.) and sodium wire (10.5 g.) were heated to 110°–120°, and ethyl propionate (25 g.) was added in one batch and the whole refluxed for five hours. It may be noted that in the compound ethyl n-propionate, ethyl represents the radical R′ of Equation 1 whereas R (methyl) is present as a portion of the propionate residue. A red color developed after about one-half hour. The flask was allowed to cool overnight. The contents were triturated with 40 c. c. ether and then refluxed for fifteen minutes. After cooling, filtering, and washing with ether, the red salt was air-dried. Weight 60 g. The red solid was dissolved in 200 c. c. of warm water and acidified with dilute sulfuric acid. A brown solid separated and was skimmed off. The mother liquor was extracted with ether and dried over sodium sulfate. After removal of the ether, the light brown solid was combined with that removed mechanically and both recrystallized from alcohol. The product weighed 11.2 g. (31%) and melted at 83.5°–85°.

STEP 2.—*1,3-diketo-2-methyl indanyl acetic ester (Structure II)*.—2-methyl indan-1,3-dione (Structure I) (10 g.) was dissolved in 40 c. c. 95% alcohol. To this was added a solution of 3.5 g. potassium hydroxide in 20 c. c. 95% alcohol. The red solution of the potassium salt was cooled to room temperature and 9.5 g. of ethyl bromacetate were added. The solution was refluxed with occasional shaking for three hours. After evaporation to about 40 c. c. the solution and the suspended potassium bromide were poured into 400 c. c. of ice water. The product (Structure II), which separated overnight was recrystallized from alcohol. The compound is white when finely divided, but pale yellow in the large prisms and melts at 91°–92°. Yield 9.5 g. (62%).

Anal. calc. for $C_{14}H_{14}O_4$: C, 68.31; H, 5.73. Found: C, 68.46; H, 6.02.

STEP 3.—*2-methyl-3-carbethoxy-1,4-naphthohydroquinone (Structure III)*.—Sodium (1 g.) was dissolved in 20 c. c. absolute alcohol and the flask swept with hydrogen for five minutes. Five grams of the methyl indanyl acetic ester (Structure II) were added, and the resulting brownish-red solution refluxed for one and one-quarter hours in a hydrogen atmosphere. During this time the hydrogen stream entrained enough alcohol vapors that a skum was present. Ten c. c. of boiled, cooled water were added through the condenser before the solution was opened to the air. The reaction solution was poured into 100 c. c. cold, boiled, acidified water. The light brown precipitate (Structure III) was allowed to coagulate. The product was recrystallized from alcohol-water once and from benzene once. The white needles turn pale yellow on exposure to air. Melting point 97°–99°, yield 2.2 grams (44%), the pure compound melts at 100°–101°.

Anal. calc. for $C_{14}H_{14}O_4$: C, 68.31; H, 5.73. Found: C, 68.27; H, 5.65.

STEP 4.—*2-methyl-1,4-naphthoquinone (Structure IV)*.—2-methyl-3-carbethoxy-1,4- naphtho - quinone (Structure III), (1.0 g.) was dissolved in 12 c. c. of 5% sodium hydroxide to which 5 drops of ethyl alcohol had been added. The deep brownish-red solution was refluxed in a hydrogen atmosphere for two hours. After acidification with 6 N hydrochloric acid (still under hydrogen), the light purple slid was filtered off and dissolved in 10 c. c. of glacial acetic acid. To this was added 0.5 g. chromic oxide in 5 c. c. water, and the resulting solution heated on the steam bath for fifteen minutes. The light yellow needles which separated on dilution with water weighed 0.55 g., 78%.

STEP 6.—*2-methyl-3-carbethoxy-1,4-naphthoquinone (Structure VI)*.—One-half gram of 2-methyl-3-carbethoxy-1,4 - naphthohydroquinone (Structure III) was dissolved in 6 c. c. glacial acetic acid. A solution of 0.15 g. chromic oxide in 3 c. c. water was added, and the solution heated on the steam bath for five minutes. Ten c. c. cold water were added and the solution set in ice to crystallize. The product (Structure VI) weighs 0.46 g. (92%), crystallizes in yellow plates, and melts at 99°–100°.

Anal. calc. for $C_{14}H_{12}O_4$: C, 68.82; H, 4.99. Found: C, 68.97; H, 5.19.

It is to be understood that Step 4, Step 5 or Step 6 may be used with the preliminary Steps 1, 2 and 3 in the herein described procedures depending upon which of the compounds, Structure IV, Structure V, or Structure VI is desired.

The processes herein described are useful for the production of compounds of the type illustrated in Structures IV, V and VI, wherein radical R may alkyls such as methyl, ethyl, normal propyl, or normal butyl. Of these, 2-methyl-1,4-naphthoquinone is of especial usefulness in that it has the same physiological effectiveness as natural vitamin K, namely, 2-ethyl-4-phytyl-1,4-naphthoquinone.

While the invention has been described in detail with specific examples, such examples are merely illustrative of the invention and are not intended as limitations since other modifications within the spirit and scope of the invention will be apparent to those skilled in the art. Hence the invention is to be understood as limited only as indicated in the appended claims.

I claim as my invention:

1. The process of preparing 2-alkyl-naphthoquinones comprising treating the corresponding 2-alkyl-3-carbethoxy-1,4-naphthohydroquinones with an alkali, so as to produce the alkali salt of the corresponding hydroquinone acid, then treating said salt with an acid and with an oxidizing agent, and separating carbon dioxide so as to produce the corresponding 2-alkyl-naphthoquinone.

2. The process as set forth in claim 1 characterized in that the alkyl radical is chosen from the group consisting of methyl, ethyl, normal propyl and normal butyl.

3. The process of preparing 2-methyl-naphthoquinone comprising heating 2-methyl-3-carbethoxy-naphthohydroquinone in a dilute alkali hydroxide solution containing a small amount of alcohol, under an atmosphere of hydrogen, then acidifying to precipitate a solid and heating with an oxidizing agent whereby the hydroquinone form is oxidized to the quinone, separating the thus formed product.

C. FREDERICK KOELSCH.

CERTIFICATE OF CORRECTION

Patent No. 2,334,103.  November 9, 1943.

CHARLES FREDERICK KOELSC .

It is hereby certified that error appears in the printed specification of the above numbered patent requiring correction as follows: Page 3, second column, line 48, before "understood" insert --to be--; page 4, first column, line 51, for "slid" read --solid--; and second column, line 21, after "may" insert --be--; and that the said Letters Patent should be read with this correction therein that the same may conform to the record of the case in the Patent Office.

Signed and sealed this 25th day of January, A. D. 1944.

(Seal)

Henry Van Arsdale,
Acting Commissioner of Patents.